UNITED STATES PATENT OFFICE 2,190,172

AZO DYESTUFFS

Helmut Kleiner, Cologne-Mulheim, and Detlef Delfs and Otto Bayer, Leverkusen-Wiesdorf, Germany, assignors to General Aniline & Film Corporation, a corporation of Delaware No Drawing. Application August 9, 1938, Serial No. 223,933. In Germany August 19, 1937

4 Claims. (Cl. 260—171)

The present invention relates to new azo dyestuffs and to a process of preparing the same; more particularly it relates to azo dyestuffs of the general formula

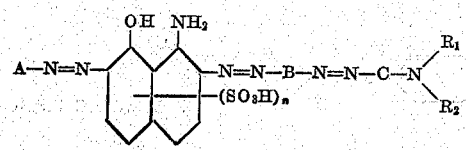

In this general formula A—N=N— stands for the radical of a monodiazo compound,

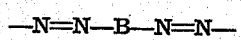

for the radical of a tetrazo compound derived from a diaminodiaryl and C for an aromatic radical bearing the

group in p-position to the —N=N— group; $R_1$ means hydrogen or an organic radical and $R_2$ an organic radical containing a sulfonic acid group connected via a sulfur atom; $n$ stands for the numbers one or two.

Our new dyestuffs can be obtained by coupling in acid solution a tetrazotized diaminodiaryl with a 1-amino-8-hydroxynaphthalene sulfonic acid capable of coupling twice, and combining the intermediate thus obtained with one mol of a monodiazo compound and one mol of an amine which couples in p-position and the amino group of which bears the radicals $R_1$ and $R_2$ defined above. The sulfonic acid group connected via a sulfur atom, which is contained in the radical $R_2$, may also be introduced after the formation of the dyestuff.

As initial components (designated A in the above formula) may be used e. g. the amino compounds of the benzene series and their sulfonic or carboxylic acids, such as aniline, the aniline sulfonic acids, the aniline carboxylic acids, the amino diphenyl sulfonic acids and the halogen, amino, acetoamino and nitro substitution products thereof. As second components are employed the 1-amino-8-hydroxynaphthalene sulfonic acids which are capable of coupling twice such as 1-amino-8-hydroxynaphthalene-3,6-disulfonic acid, 1-amino-8-hydroxynaphthalene-4,6-disulfonic acid, 1-amino-8-hydroxynaphthalene-4-sulfonic acid. As tetrazo components benzidine, its substitution products as e. g. the alkyl, alkoxy, halogen substitution products and the sulfonic acids thereof are used. The final components amines capable of coupling in p-position to the group

are amines of the benzene and naphthalene series; they may further be substituted in the nucleus by alkyl, alkoxy, halogen and the amino group. These amines which contain in the radical $R_2$ the sulfonic acid group connected via a sulfur atom are obtainable by causing a corresponding amine which contains in the radical $R_2$ a reactive group as e. g. halogen to react with a thiosulfate or a mercapto compound. In the same manner the sulfonic acid group connected via a sulfur atom can also be introduced into the $R_2$ radical after the formation of the dyestuff. $R_1$ in these amines may stand e. g. for hydrogen, alkyl, hydroxyalkyl, halogenalkyl, cycloalkyl and aralkyl.

The new dyestuffs are distinguished by a good solubility in cold water. They dissolve in water in general with bluish-black coloration and in concentrate sulfuric acid with a more bluish tinge. The dyestuffs are especially suited for dyeing leather and vegetable fibers which materials they generally dye in black shades. The dyeings on velvet leather are distinguished by the desired bluish tinge.

The following examples illustrate the invention, without, however, restricting it thereto, the parts being by weight.

Example 1

184 parts of benzidine are diazotized in the usual manner and combined with 341 parts of the monosodium salt of the 1-amino-8-hydroxynaphthalene-3,6-disulfonic acid in mineral acid solution. After finishing the reaction 93 parts of aniline are diazotized in the usual manner and added to the solution. Then, while cooling and stirring well, an aqueous sodium carbonate solution is added drop by drop to the mixture, until the coupling liquor shows distinctly a reaction alkaline by sodium carbonate. If in a testportion, taken therefrom, diazobenzene can no longer be detected, an aqueous solution of 311 parts of sodium N-butyl-anilinoethane-thiosulfate are added. After some hours' stirring the dyestuff obtained, which has in the free state the constitution:

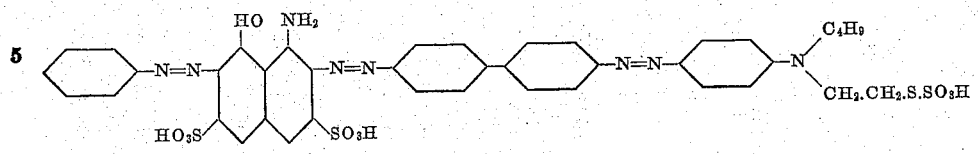

is separated by adding salt. It dyes cotton deep greenish black shades. Also on leather it yields valuable black shades.

Especially the dyeings on velvet-leather are distinguished by the very desired bluish-black shade. If the sodium N-butyl-anilinoethane-thiosulfate is replaced by a compound of the constitution

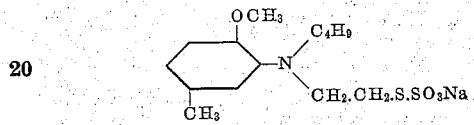

a dyestuff is obtained which dyes the vegetable fiber and leather somewhat clearer and somewhat

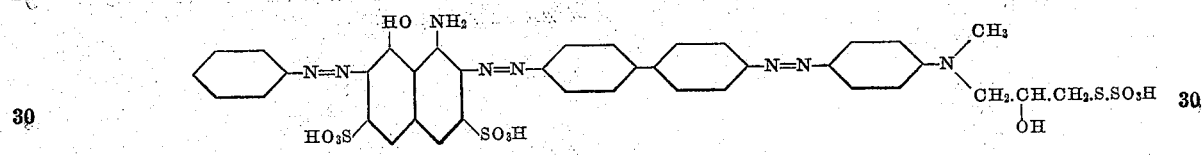

more bluish shades. If instead of benzidine o-tolidine is used dyestuffs of similar properties are obtained.

Example 2

184 parts of benzidine are tetrazotized and combined with 341 parts of the monosodium salt of the 1-amino-8-naphthol-3,6-disulfonic acid in mineral acid solution. Then an aqueous solution of diazobenzene-p-sulfonic acid, prepared from 173 parts of aniline-p-sulfonic acid is added and, while stirring and cooling, the mixture is rendered alkaline by sodium carbonate. When all diazobenzene-p-sulfonic acid has disappeared, 311 parts of sodium N-butyl-anilinoethane-thiosulfate dissolved in water, are added. After stirring for some hours the dyestuff liquor is concentrated by evaporation and the dyestuff having in the free state the constitution

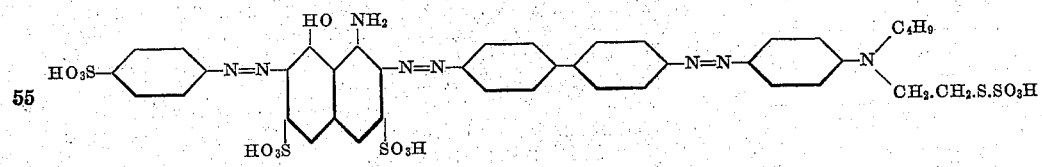

is separated by adding mineral acid and salt. It dyes cotton and leather in deep black shades. Compared with the dyestuff of Example 1 it possesses an even better solubility and a somewhat redder shade.

Similar dyestuffs are obtained, if the butyl radical of the sodium N-butyl-anilinoethane-thiosulfate is replaced by the methyl or ethyl group;

if it is replaced by the benzyl radical the shades shift somewhat to the greenish side.

Example 3

The dyestuff intermediate

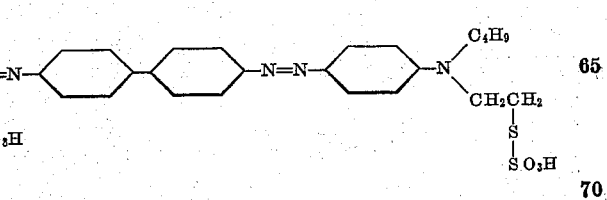

is obtained as described in Example 1. As soon as diazobenzene can no longer be detected, 299 parts of sodium γ-(N-methyl-anilino)-β-hydroxy-propanethiosulfate dissolved in water are added. When the formation of the dyestuff is complete the reaction product having in the free state the constitution is separated by adding salt. It dyes leather and cotton in deep black shades, which differ from those of Example 1 by their bluer shade.

Example 4

184 parts of benzidine are tetrazotized in the usual manner and combined with 341 parts of the monosodium salt of the 1-amino-8-hydroxy-naphthalene-3,6-disulfonic acid in mineral acid solution. When the coupling is complete 249 parts of the 1-aminodiphenyl-2-sulfonic acid are diazotized and added, and while cooling and stirring well, an aqueous sodium carbonate solution is added drop by drop, until the coupling liquor shows distinctly a reaction alkaline by sodium carbonate. When no diazo compound can be detected any longer an aqueous solution of 311 parts of sodium N-butylanilinoethane-thiosulfate is added. After stirring for some hours the trisazo dyestuff having in the free state the constitution

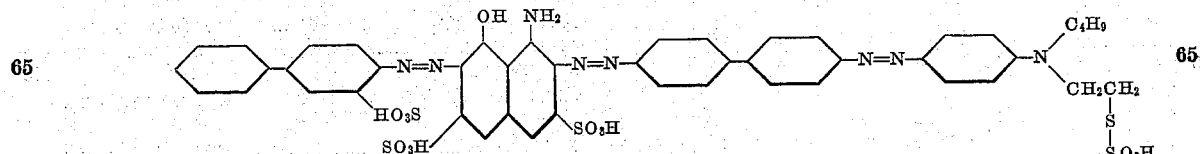

is separated by adding salt. It dyes wool in greenish-grey shades, cotton and viscose in greyish-black shades; the black dyeings on leather are somewhat clearer and greener than those with the dyestuff of Example 2.

Example 5

184 parts of benzidine are tetrazotized and combined with 341 parts of the monosodium salt of the 1-amino-8-hydroxynaphthalene-3,6-disulfonic acid in acid solution. If uncoupled 1-amino-8-hydroxynaphthalene-3,6-disulfonic acid can no longer be detected an aqueous solution of diazobenzene-4-sulfonic acid, obtained by diazotizing 173 parts of p-sulfanilic acid is added and the mixture rendered weakly alkaline by sodium carbonate while stirring. When the coupling is complete 345 parts of sodium N-benzylanilinoethane-thiosulfate dissolved in 4000 parts of water are added. When after stirring for some hours without cooling the formation of the trisazo dyestuff is finished, the liquor is weakly acidified and the dyestuff having in the free state the constitution

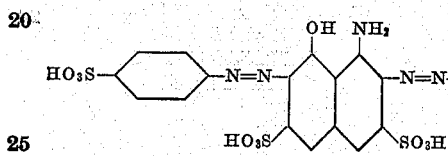

is separated by adding salt. It dyes cotton and leather bluish-grey shades.

Example 6

344 parts of benzidine-o.o'-disulfonic acid are dissolved in about 2000 parts of hot water containing the requisite quantity of alkali, and when cold 140 parts of sodium nitrite dissolved in about 2000 parts of water are added. The mixture is run into 1600 parts of hydrochloric acid (sp. gr. 1.15) diluted with three times the quantity of water. After 5 hours the tetrazo compound is separated and combined in mineral acid solution with 341 parts of the mono-sodium salt of the 1-amino-8-hydroxynaphthalene-4.6-disulfonic acid. When the coupling is complete an aqueous solution of diazobenzene-4-sulfonic acid, obtained by diazotizing 173 parts of p-sulfanilic acid is added and the mixture rendered weakly alkaline by sodium carbonate while stirring. When all diazobenzene-4-sulfonic acid has disappeared, 311 parts of sodium N-butylanilinoethane-thiosulfate dissolved in water are added. After stirring for some hours the dyestuff, which in the free state has the constitution

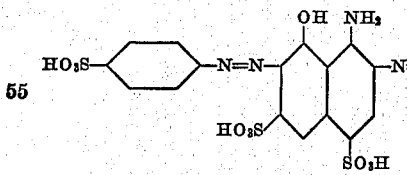

is separated from the acidified liquor by adding salt. It dyes cotton in bluish-grey and leather in black shades.

We claim:

1. As new products azodyestuffs of the general formula

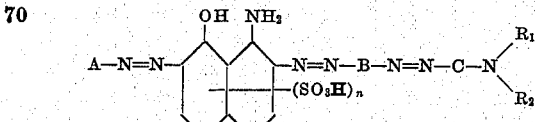

wherein A—N=N— stands for the radical of a monodiazo compound of the benzene series, $$—N=N—B—N=N—$$

stands for the radical of a tetrazo compound derived from a diaminodiaryl of the benzene series, C stands for an aromatic radical of the benzene series bearing the

group in p-position to the —N=N— group, $R_1$ stands for a radical of the group consisting of

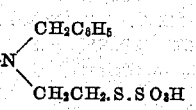

hydrogen, alkyl, hydroxyalkyl, halogenalkyl, cycloalkyl, and aralkyl, $R_2$ stands for one of the group consisting of —alkylene—$S.SO_3H$ and —hydroxyalkylene—$S.SO_3H$ and n stands for one of the numbers one or two.

2. As new products azo dyestuffs of the general formula

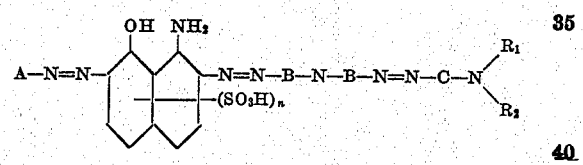

wherein A—N=N— stands for the radical of a monodiazo compound of the benzene series, $$—N=N—B—N=N—$$

stands for the radical of a tetrazo compound derived from a diaminodiaryl of the group consisting of benzidine, its alkyl, halogen, and alkoxy substitution products and the sulfonic acids thereof, C bearing the

group in p-position to the —N=N— group stands for one of the group consisting of the benzene nucleus and its alkyl, alkoxy, halogen and amino substitution products, $R_1$ stands for a radical of the group consisting of hydrogen, alkyl, hydroxyalkyl, halogenalkyl, cycloalkyl, and aralkyl, $R_2$ stands for one of the group consisting of —alkylene—$S.SO_3H$ and —hydroxyalkylene—$S.SO_3H$ and n stands for one of the numbers one and two.

3. As new products azodyestuffs of the general formula

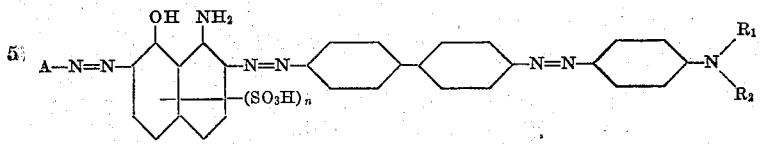

wherein A—N=N— stands for the radical of a monodiazo compound of the benzene series, $R_1$ stands for a radical of the group consisting of hydrogen, alkyl, hydroxyalkyl, halogenalkyl, cycloalkyl and aralkyl, $R_2$ stands for one of the group consisting of —alkylene—S.SO$_3$H and —hydroxyalkylene—S.SO$_3$H and $n$ stands for one of the numbers one and two.

4. As new product the azo dyestuff corresponding in its free state to the formula

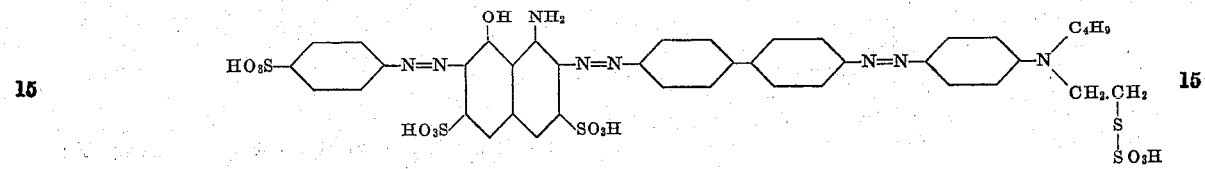

dyeing cotton and leather deep black shades.

HELMUT KLEINER.
DETLEF DELFS.
OTTO BAYER.